Oct. 8, 1957   J. R. WALLIN ET AL   2,808,722
DEW RECORDER
Filed July 29, 1954
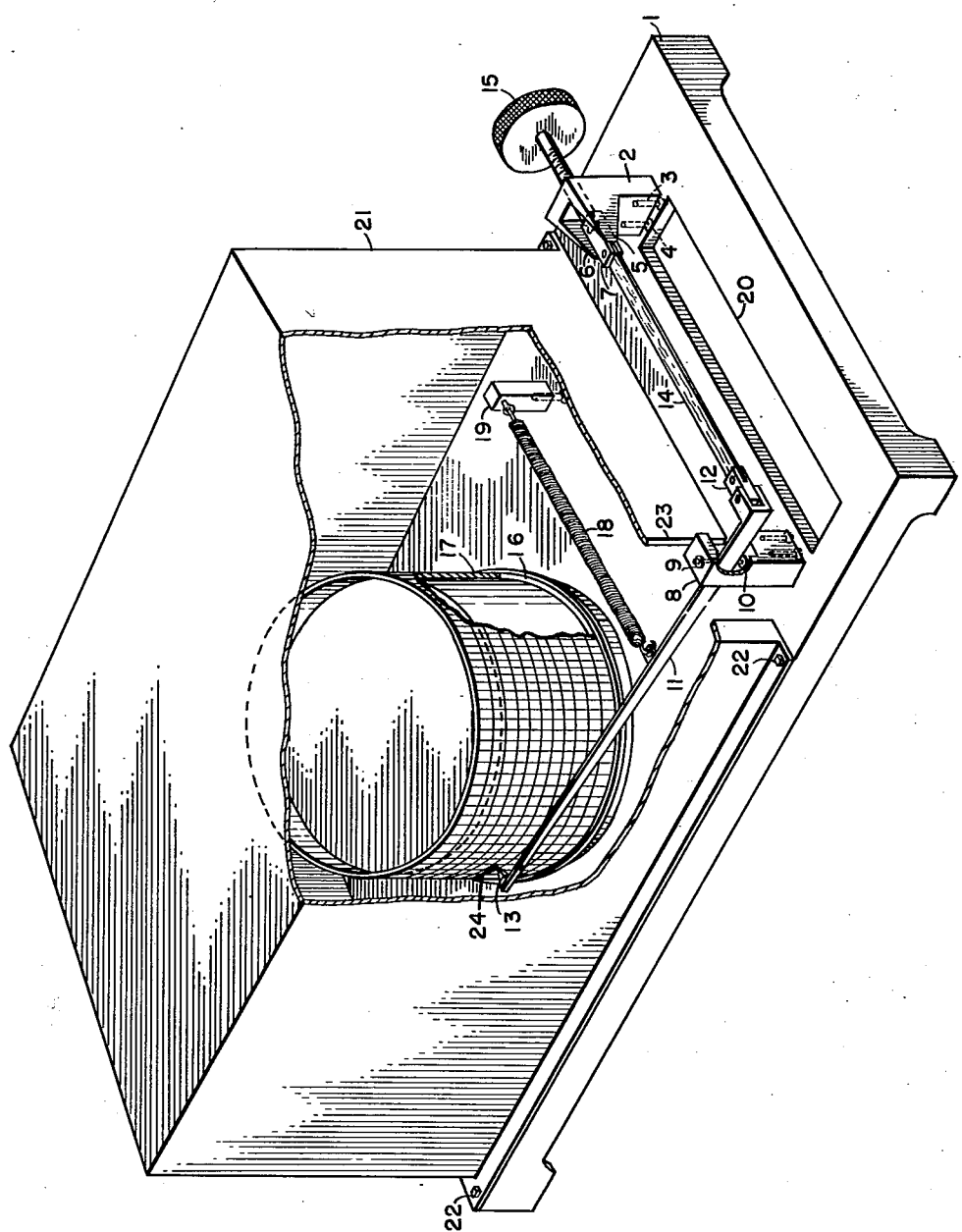
INVENTORS
J. R. WALLIN
DALE M. POLHEMUS
BY
ATTORNEY 2,808,722
                         DEW RECORDER Jack R. Wallin and Dale N. Polhemus, Ames, Iowa
             Application July 29, 1954, Serial No. 446,689
                      6 Claims.  (Cl. 73—171)
             (Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to an instrument for recording the time and duration of dew deposition.

It is an object of this invention to provide an instrument which will record the time of commencement and duration of moisture deposition attributable to dew, frost, or rainfall or any combination of the three.

Another object is to provide an instrument that will record deposition continuously over a given period of time.

Still another object is to provide an instrument that will begin recording deposition within such a short time after commencement that the lag interval will not be of any significant time.

An additional object is to provide an instrument which will record only periods of actual water deposition, but which will be independent of relative humidity conditions.

Other objects will appear hereinafter during the course of the detailed description of the invention.

In order that the invention may be fully understood, reference will be made to the following description and the accompanying drawing in which:

In its broadest aspect, the instrument comprises a water-sensitive element connected to recording means in such a manner that, when the sensitive element is wet, it will permit the recording means to bear on a chart mounted on a clock mechanism and thus produce a permanent record of the length of time the element is actually wet.

The single figure is a perspective view of a preferred form of the assembled instrument.

The instrument comprises essentially a strip of lamb gut or casing rigidly secured at one of its ends to a stationary clamp and secured at its other end to one end of a pivoted pen. The animal membrane is characterized by its extreme sensitivity to direct wetting. When wet, the strip of gut expands sharply and permits the pen to contact a chart mounted on a revolving drum. As the gut dries it contracts and withdraws the pen from contact with the chart.

In greater detail, the instrument comprises a base 1, near one corner of which is mounted a post 2. This post may be integral with the base or secured to it by any suitable means, such as, screws 3 and 4. Post 2 is provided at its upper end with a pair of jaws 5, 6 which house slidable clamp block 7. Near an adjacent corner of the base, and opposite post 2, there is another post 8 carrying pivot bearings 9 and 10. Pivotally mounted in bearings 9 and 10 to rotate in a horizontal plane is pen arm 11, one end of which carries a clamp block 12 and the other end of which carries a pen 13. A strip of lamb gut or casing 14 is clamped between clamps 7 and 12 and forms the sensitive element. Tension in the strip of gut may be regulated by means of thumbscrew 15. In order to record the duration of dew deposition there is provided a seven-day clock having a revolving drum 16 which carries chart 17. Tension in the animal membrane 14 is so adjusted that, when the membrane is not actually wet, the pen 13 is kept out of contact with the drum and chart. Upon being wet by dew or rain the sensitive membrane 14 expands and pen 13 is drawn into contact with chart 17 by means of spring 18 secured between stationary post 19 and pen arm 11. A coil spring made of .008 piano wire, 8 cm. long and 0.4 cm. in diameter has been found satisfactory for the purpose. Since the instrument will record only periods during which the senistive element is actually wet, and not different degree of moisture, the pen need only pivot in one plane to produce the straight line record 24 shown on chart 17.

Directly beneath the sensitive membrane, a slot 20 is cut in the base 1 to provide proper ventilation.

In the preferred form both the drum and pen are protected by cover 21, leaving only membrane 14 exposed to the atmosphere. This cover is secured to base 1 by means of bolts 22 and is provided with a wide slot 23 in its side to permit free movement of the pen.

The sensitive membrane 14 for the particular model herein described is preferably about 20 microns thick, 0.7 cm. wide, 8.8 cm. long when dry, and 9 cm. long when wet. Although it is brittle and will not withstand excessive tension when dry, it is only in a dry condition at relative humidities below about 25 or 30%.

We claim:

1. Apparatus for recording the duration of dew and/or rainfall deposition comprising: an animal membrane sensitive only to and sharply expandable on direct contact with liquid water; recording means connected to the sensitive element; and clock means bearing a chart, said chart being so disposed in relation to the recording means that it will be contacted by said recording means during periods in which water is present on the aforementioned sensitive element, but will not be contacted by said recording means when no water is present on the sensitive element.

2. Apparatus for recording the duration of dew and/or rainfall deposition comprising: an element sensitive only to direct contact with water, said element being sharply expandable when wet with liquid water and shrinkable when dried; recording means pivotally connected to the sensitive element; clock means bearing a chart, said chart being so disposed in relation to the recording means that it will be contacted by said recording means during periods in which water is present on the aforementioned sensitive element, but will not be contacted by said recording means when no water is present on the sensitive element; and resilient means adapted to draw the recording means into contact with the chart when the sensitive element expands on being wet.

3. The apparatus of claim 2 in which the recording means comprises a pivoted arm having writing means secured to the end of said arm adjacent the chart.

4. The apparatus of claim 2 in which the sensitive element comprises a strip of animal membrane.

5. The apparatus of claim 4 in which the animal membrane comprises a strip of lamb gut.

6. The apparatus of claim 4 in which the animal membrane comprises a strip of lamb gut about 20 microns in thickness.

References Cited in the file of this patent
UNITED STATES PATENTS

| | | |
|---|---|---|
| 1,151,814 | Norwood et al. | Aug. 31, 1915 |
| 1,236,381 | Rogers | Aug. 7, 1917 |
| 1,998,340 | Streb et al. | Apr. 16, 1935 |
| 2,034,884 | Sharp | Mar. 24, 1936 |
| 2,682,858 | Case | July 16, 1954 |